O. A. GOODRICH.
FOUR WHEEL POSITIVE DRIVE.
APPLICATION FILED JULY 11, 1908.
941,514.
Patented Nov. 30, 1909.
4 SHEETS—SHEET 1.
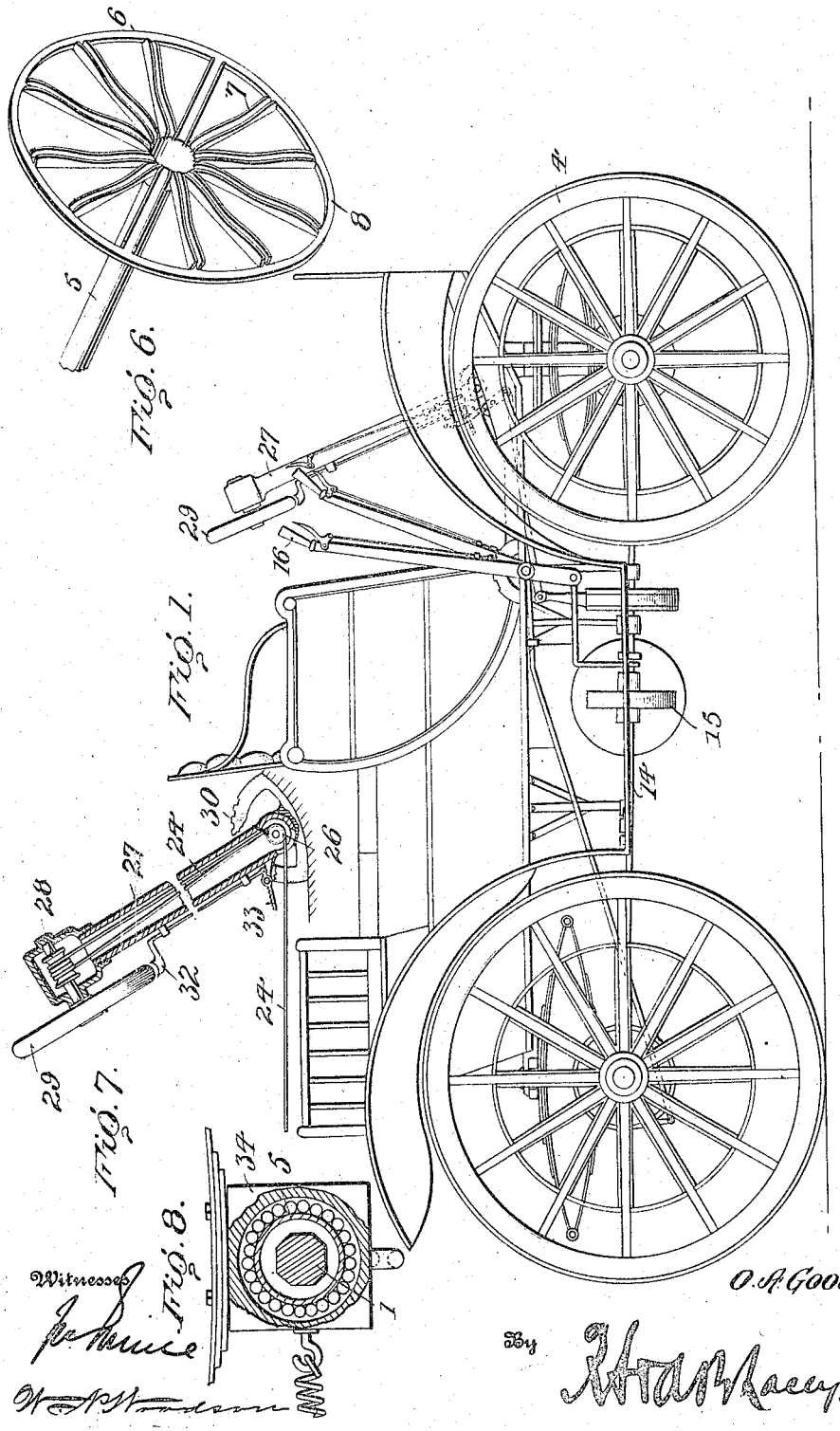
Inventor
O. A. Goodrich

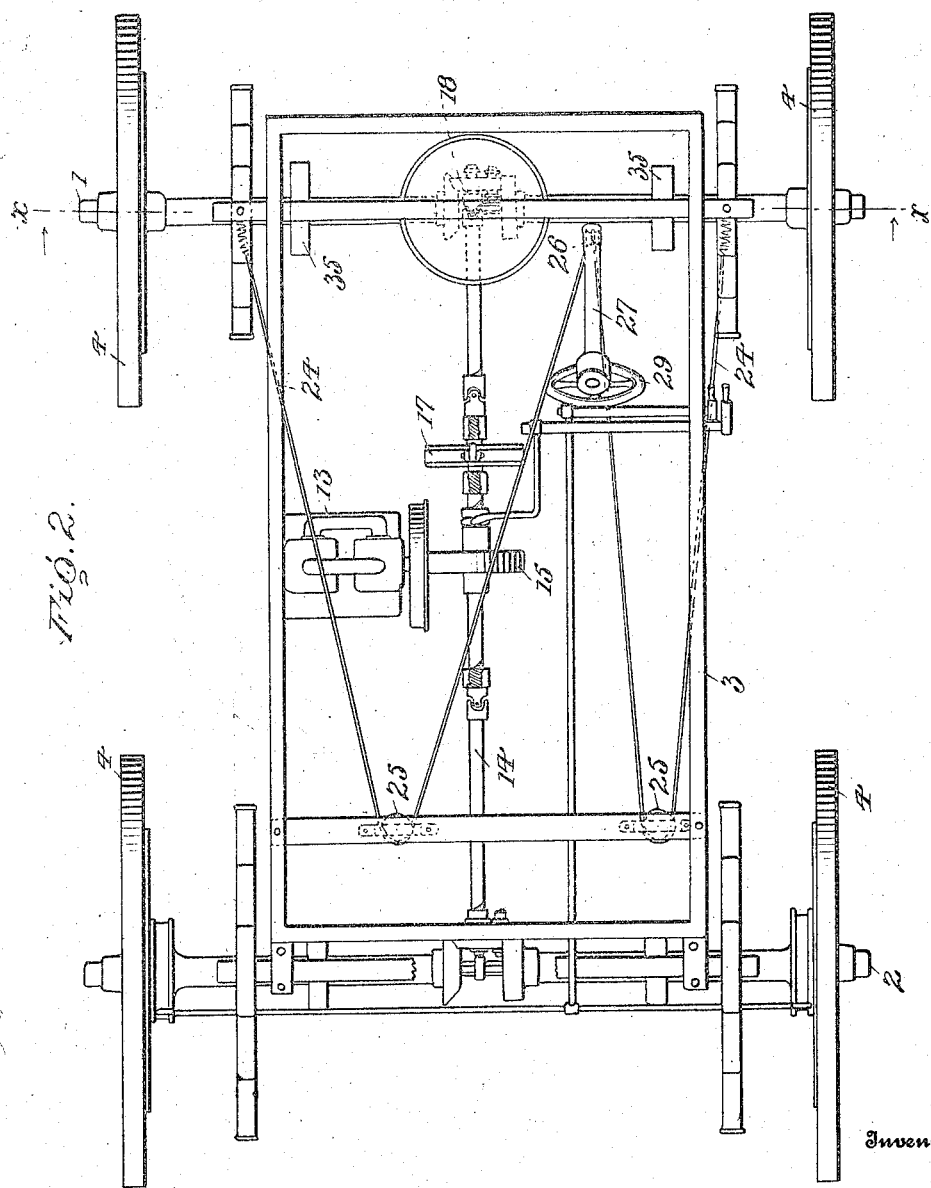

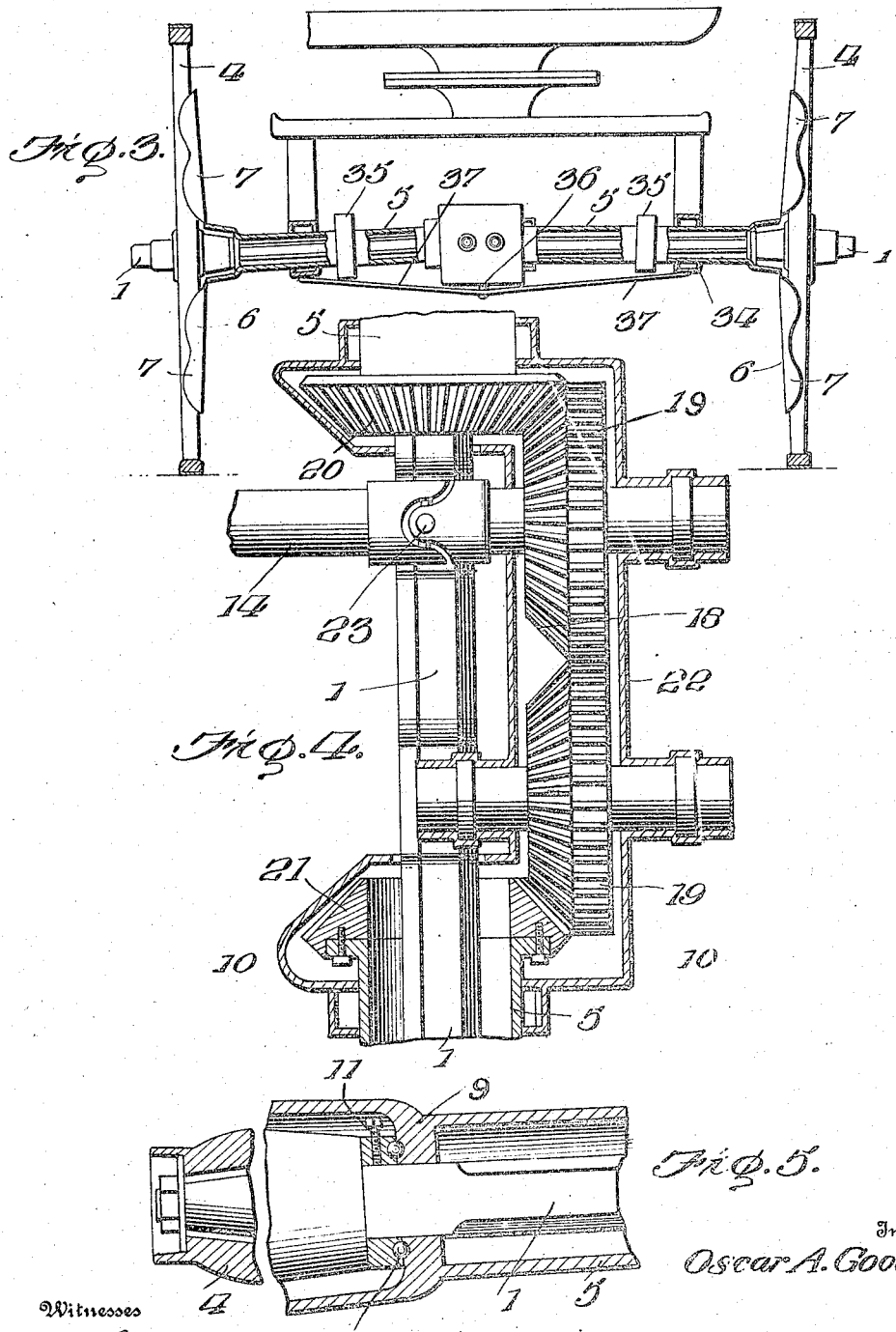

O. A. GOODRICH.
FOUR WHEEL POSITIVE DRIVE.
APPLICATION FILED JULY 11, 1908.
941,514.
Patented Nov. 30, 1909.
4 SHEETS—SHEET 4.
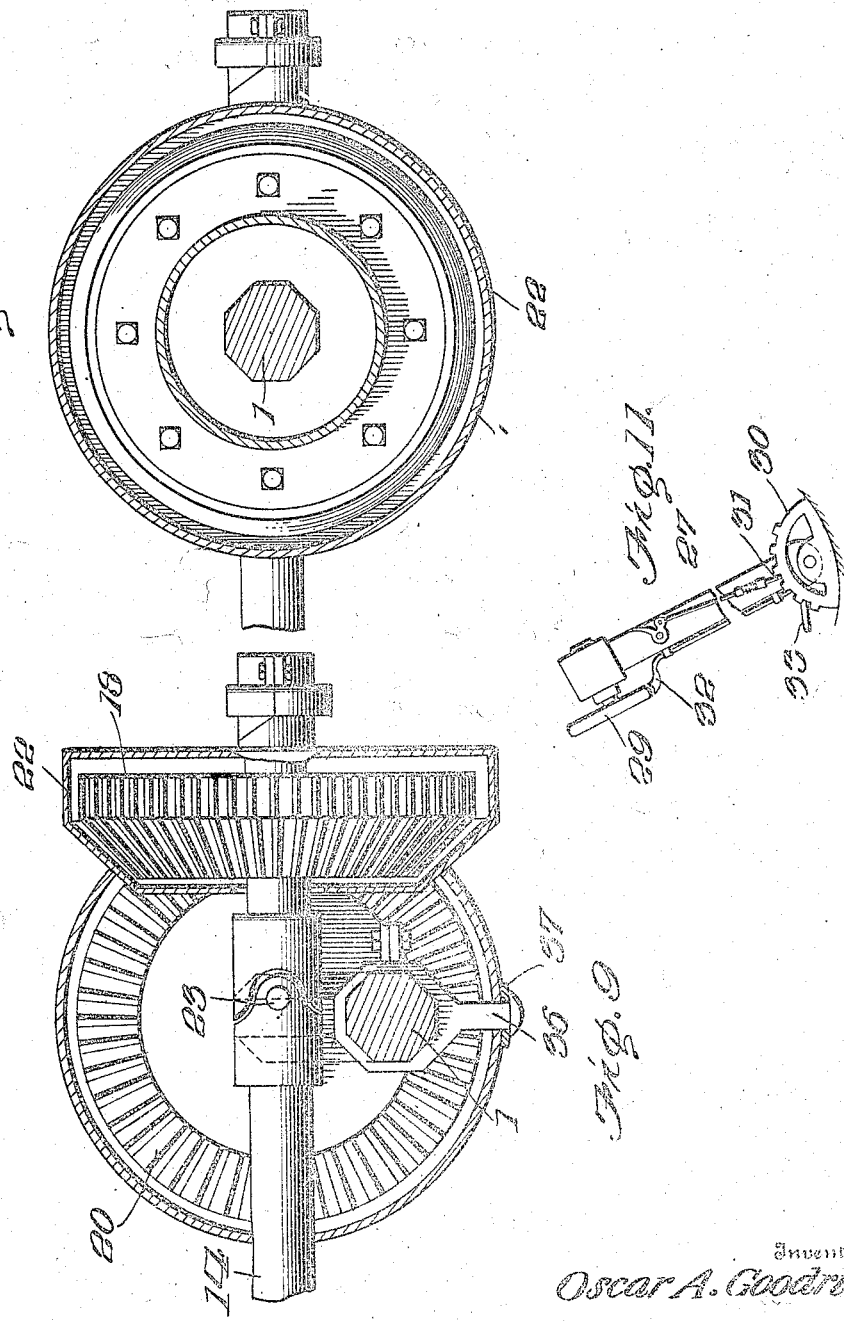
Witnesses
Inventor
Oscar A. Goodrich
By
Attorneys

UNITED STATES PATENT OFFICE.

OSCAR A. GOODRICH, OF SIOUX CITY, IOWA, ASSIGNOR OF FIVE-EIGHTHS TO JOHN N. WARREN AND ONE-EIGHTH TO FOWLER A. SEAMAN, OF SIOUX CITY, IOWA.

FOUR-WHEEL POSITIVE DRIVE.

941,514.      Specification of Letters Patent.      Patented Nov. 30, 1909.

Application filed July 11, 1908. Serial No. 443,051.

*To all whom it may concern:*

Be it known that I, OSCAR A. GOODRICH, citizen of the United States, residing at Sioux City, in the county of Woodbury and State of Iowa, have invented certain new and useful Improvements in Four-Wheel Positive Drives, of which the following is a specification.

The present invention relates to power transmitting mechanism for vehicles, such as buggies, carriages, wagons, drays, etc., generally drawn by horses, whereby the same may be mechanically propelled and power applied to each of the four wheels, yet admitting of the front axle turning and the wheels rotating at different speeds as when turning or passing over rolling ground or surface.

The invention is particularly adapted for vehicles of the class aforesaid, nevertheless, it may be advantageously embodied in automobiles and like mechanically propelled machines so as to apply power to each of the four ground or supporting wheels.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a vehicle of the four-wheeled type embodying the invention. Fig. 2 is a top plan view of the running gear. Fig. 3 is a transverse section on the line *x—x* of Fig. 2, looking toward the front, as indicated by the arrows. Fig. 4 is a horizontal section of the gearing connecting the power shaft with the hollow axles. Fig. 5 is a longitudinal section of a hub of one of the vehicle wheels and the stationary and rotary axles. Fig. 6 is a detail perspective view of an end portion of a hollow axle, showing the wheel clutch. Fig. 7 is a longitudinal section of the standard supporting the steering wheel. Fig. 8 is a sectional view of the anti-friction bearing for a hollow axle. Fig. 9 is a sectional view on the line 9—9 of Fig. 4, looking in the direction of the arrows. Fig. 10 is a sectional view on the line 10—10 of Fig. 4, looking in the direction indicated by the arrows. Fig. 11 is a view in elevation of the steering standard.

Corresponding and like parts are referred to in the following description and indicated in all the views of the drawings by the same reference characters.

As hereinbefore stated, the invention is adapted for any style or type of vehicle, whether designed to be mechanically propelled or drawn by horse power, the purpose being to connect each of the supporting ground wheels with the driving power to positively operate the same, while admitting of the vehicle being easily and conveniently steered and operated without any of the wheels slipping, any differences of speed of the wheels as when turning or passing over rolling surfaces, being compensated for by clutch gearing of any approved type and arranged to the best possible advantage according to the style of the vehicle and the arrangement of the component parts.

The running gear comprises front and rear axles 1 and 2, a connecting framework 3, springs for neutralizing shock and vibration and ground or supporting wheels 4, the latter being loosely mounted upon the arms or spindles of the axles, the latter being stationary in contradistinction to the type of axles mounted to rotate. The axles 1 and 2 may be of usual construction and arrangement and support hollow axles 5 which are mounted thereon to rotate. Each hollow axle 5 is provided at its outer end with a wheel clutch 6, the same consisting of spoke engaging members 7 and a connecting rim 8, the latter serving to brace the members 7 at their outer ends. The spoke engaging members 7 are of substantially U-form in transverse section so as to embrace three sides of the spokes of the coöperating vehicle wheel, thereby causing said wheel and hollow axle to turn as one part. The spoke engaging members 7 are open at their outer sides, thereby admitting of the wheel 4 being slipped upon or removed from the axle either to be greased or for any other desired purpose. The purpose of the wheel clutch 6 is to make positive engagement between the wheel and the hollow axle to cause both to rotate together, it being essential that the construction of the wheel clutch be such as to admit of the wheel being readily removed and replaced. Each hollow axle is provided near its outer end with an inner flange 9, which encircles a rounded portion of the axle 1 near the base of the arm or spindle. A collar 10 is slipped upon the end portion of the axle 1 and is secured thereto by means of a set screw 11 or other suitable fastening. The opposing faces of the collar 10 and flange 9 are curved to form a race in which a series of balls 12 are placed.

The motor 13 may be of any type usually employed for operating mechanically propelled road machines. A power shaft 14 extends lengthwise of the vehicle and is adapted to derive motion from the motor 13 by suitable gearing, that shown being of the frictional type.

To regulate the speed of the machine, the gear element 15 loose upon the power shaft 14 is adapted to be moved backward and forward by means of a lever 16 extended within convenient reach of the operator. The power shaft is provided with one or more gimbal or universal joints to obviate straining and allow for variation in the movements of the front and rear axles when the vehicle is traveling over uneven roads or surfaces. A clutch gear 17 of any approved type is also interposed in the length of the power shaft 14 to admit of the front and rear axles moving at different speeds, as when turning or passing over rolling surfaces. A gear wheel 18 is fast to the end portion of the power shaft and is geared to the inner ends of the hollow axles mounted upon the same stationary axle.

In order that both hollow axles mounted upon the same stationary axle may be positively driven in the same direction, an idler 19 is provided, the same transmitting motion from the gear wheel 18 to the gear wheel 21 fast to the inner end of the hollow axle opposite that with which the gear wheel 18 is in direct mesh. This is shown most clearly in Fig. 4. The gear wheel 20 at the inner end of the axle, directly geared to the shaft 14, is of the crown type as is also the gear wheel 21 fast to the inner end of the axle. The style of the gearing between the power shaft and the hollow axles is immaterial so long as power is transmitted from the shaft 14 to the axles 5. The several gears are housed or incased, the housing 22 being of such formation as to snugly inclose the operating parts, thereby excluding dust, confining the lubricant and assisting materially in supporting the working parts.

It is to be understood that the rear axle 2 is stationary, whereas the front axle is mounted to turn about a vertical axis to admit of steering the vehicle. This necessitates a fifth-wheel or king bolt connection between the fore-truck and the vehicle body to admit of the turning of the front axle.

It is also essential that a universal or gimbal joint 23 be provided near the front end of the power shaft 14 in line with the vertical axis about which the front axle turns. The gear wheel 18 is fast to the end portion of the power shaft 14 forward of the joint 23 so as to maintain a fixed relation with the coöperating gears 19 and 20 and for steering the vehicle, cables, chains, or like connections 24 are attached to the end portions of the front axle and thence extend rearward and pass around guide pulleys 25, thence forward and around a guide pulley 26 at the lower end of a standard 27, thence upward through said standard to a drum 28 around which it is passed a number of times and to which it is attached. The drum 28 is mounted upon or forms part of a shaft to which a hand wheel 29 is connected, said hand wheel being in a plane about parallel with the standard 27 so as to be out of the way. Upon turning the hand-wheel 29, the drum 28 is rotated, thereby moving the flexible connection 24 in the manner well understood to effect a turning of the front axle so as to direct the vehicle or machine in the required course. The steering standard 27 is mounted to swing forward or rearward at its upper end to suit the convenience of the operator and to admit of ingress to and egress from the vehicle being conveniently effected. The steering standard is held in the required adjusted position by means of a toothed segment 30 and a latch bolt 31, the latter being carried by the standard and the former attached to a part of the machine, as indicated most clearly in Fig. 11. The hand-wheel 29 may be held in an adjusted position to admit of both hands being free by means of a brake 32, the same being mounted upon the steering standard and adapted to be operated by means of a foot lever 33. When the machine is traveling on a straight road, pressure of the foot upon the lever 33 brings the brake 32 into engagement with the wheel 29 and secures the same, thereby permitting freedom of both hands.

A roller bearing 34 is provided near the outer end of each hollow axle and supports the same and is connected to the spring or other support. This is indicated most clearly in Figs. 3 and 8. A clutch gear 35 is supplied to admit of the wheels of the same axle turning at different relative speeds, as when making a curve. The clutch gears 35 may be of any pattern or make commonly employed in mechanically propelled machines and may be arranged in any convenient position to admit of the attainment of the result stated. It is necessary to hold the front axle 1 stationary, that is, to prevent rotation thereof about its longitudinal axis, while at the same time providing for its turning to allow for steering. This is accomplished by means of a post 36 which must occupy a central position. The post 36 extends upward between the gears 20 and 21 at the inner ends of the hollow axle 5 and is secured at its upper end to the axle 1, Fig. 9. The lower end of the post 36 is connected to the truss brace 37 and the brace is connected at its outer ends to the roller bearings 34, Fig. 3.

Having thus described the invention, what is claimed as new is:

1. In vehicle running gear, the combination of an axle mounted to turn about a vertical axis, wheels mounted upon the arms of the axle, hollow axles mounted upon end portions of the main axle and having connection at their outer ends with the wheels, a longitudinally disposed power shaft having a joint in vertical alinement with the axis about which the axle turns, gearing between the hollow axles and the end portion of the power shaft forward of its joint, the parts being disposed to positively drive the hollow axles and yet admit of the main axle turning easily about the vertical axis, and a support for the main axle in line with its axis and adapted to hold the main axle from rotating.

2. In a vehicle running gear, the combination of a main axle, wheels mounted upon the arms thereof, hollow axles mounted upon end portions of the main axle and having connection with the said wheels, bearings for the hollow axles, a brace connecting said bearings, a post connected at its upper end to the main axle and connected at its lower end to said brace, a power shaft, and gearing between the power shaft and hollow axles to positively drive them in the same direction.

3. In vehicle running gear the combination of a main axle, wheels mounted upon the arms thereof, hollow axles mounted upon end portions of the main axle, clutches secured to the outer end of the hollow axles, and embodying radially disposed channeled portions adapted to engage the spokes of the wheels, a power shaft, and a driving connection between said power shaft and said hollow axles.

4. In vehicle running gear, a main axle arranged to turn about a vertical axis, wheels mounted upon the arms of said axle, hollow axles mounted upon end portions of said main axle and having connection with said wheels, bearings for the hollow axles intermediate the ends thereof, a brace rod connected to said bearings, a post secured to and depending from the main axle at the axis thereof, a connection between the lower end of said post and the brace rod, a power shaft, and a gearing connection between the power shaft and hollow axles.

In testimony whereof I affix my signature in presence of two witnesses.

OSCAR A. GOODRICH. [L. S.]

Witnesses:
W. N. WOODSON,
V. B. HILLYARD.